(12) United States Patent
Koo et al.

(10) Patent No.: US 10,691,352 B2
(45) Date of Patent: Jun. 23, 2020

(54) DATA STORAGE DEVICE AND METHOD OF OPERATING THE SAME

(71) Applicant: SK hynix Inc., Gyeonggi-do (KR)

(72) Inventors: Duck Hoi Koo, Gyeonggi-do (KR); Yong Tae Kim, Seoul (KR); Soong Sun Shin, Gyeonggi-do (KR); Cheon Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/881,859

(22) Filed: Jan. 29, 2018

(65) Prior Publication Data

US 2019/0018602 A1   Jan. 17, 2019

(30) Foreign Application Priority Data

Jul. 11, 2017   (KR) .................. 10-2017-0087681

(51) Int. Cl.
*G06F 3/06*   (2006.01)
*G06F 12/02*   (2006.01)
*G06F 12/1009*   (2016.01)
*G06F 11/10*   (2006.01)

(52) U.S. Cl.
CPC ............ *G06F 3/0619* (2013.01); *G06F 3/065* (2013.01); *G06F 3/0607* (2013.01); *G06F 3/0679* (2013.01); *G06F 11/1068* (2013.01); *G06F 12/0246* (2013.01); *G06F 12/1009* (2013.01); *G06F 2212/65* (2013.01); *G06F 2212/7201* (2013.01)

(58) Field of Classification Search
CPC ...... G06F 3/0619; G06F 3/0607; G06F 3/065; G06F 3/0679; G06F 12/0246; G06F 12/1009; G06F 2212/65; G06F 2212/7201
See application file for complete search history.

(56) References Cited

U.S. PATENT DOCUMENTS 7,934,052 B2 *   4/2011   Prins ................... G06F 13/1657
711/103

FOREIGN PATENT DOCUMENTS

KR   1020160064364   6/2016

* cited by examiner

*Primary Examiner* — David Yi
*Assistant Examiner* — Dustin B. Fulford
(74) *Attorney, Agent, or Firm* — IP & T Group LLP

(57) ABSTRACT

In a method of operating a data storage device including a non-volatile memory device, which includes a closed memory block and an open memory block, a scan pointer and a map scan information of the open memory block is generated. The scan pointer indicates a page next to a page to which a writing operation is completed. The map scan information includes a logical address information mapped in a page of the open memory block. When the data storage device is recovered from a power loss, the logical address information is read based on the map scan information. An address map is rebuilt based on the read logic address information.

18 Claims, 12 Drawing Sheets

DATA STORAGE DEVICE AND METHOD OF OPERATING THE SAME

CROSS-REFERENCES TO RELATED APPLICATION

The present application claims priority under 35 U.S.C. § 119(a) to Korean patent application number 10-2017-0087681, filed on Jul. 11, 2017, which is incorporated herein by reference in its entirety.

BACKGROUND

1. Technical Field

Various embodiments generally relate to a data storage device using a non-volatile memory device as a storage medium.

2. Related Art

Recently, the paradigm of a computer environment has changed into a ubiquitous computing environment which allows users to access a computer system anywhere, anytime. For this reason, use of portable electronic devices, such as cellular phones, digital cameras, laptop computers and the like is surging. The portable electronic devices may include a data storage device using a memory device. The data storage device may be used for storing data used in a portable electronic device.

The data storage device using the memory device may have excellent stability and durability because it does not include a mechanical driving element. Also, the data storage device is advantageous in that it may access data quickly and consume a small amount of power. Non-limiting examples of a data storage device may include a universal serial bus (USB) memory device, a memory card having various interfaces, a universal flash storage (UFS) device, a solid stage drive (SSD), etc.

SUMMARY

Example embodiments may provide a data storage device and a method of operating the same that may be capable of validly rebuilding an address map when the data storage device may be recovered from a power loss.

In an embodiment, in a method of operating a data storage device including a non-volatile memory device, which includes a closed memory block and an open memory block, a scan pointer and a map scan information of the open memory block is generated. The scan pointer indicates a page next to a page to which a writing operation is completed. The map scan information includes a logical address information mapped in a page of the open memory block. When the data storage device is recovered from a power loss, the logical address information is read based on the map scan information. An address map is rebuilt based on the read logic address information.

In an embodiment, a data storage device includes a non-volatile memory device and a control unit. The non-volatile memory device includes a closed memory block and an open memory block. The control unit is configured to generate and manage an address map for translating a logical address into a physical address of the non-volatile memory device. The control unit generates a scan pointer and a map scan information. The scan pointer indicates a page next to a page to which s write operation is completed. The map scan information includes a logical address information mapped in a page of the open memory block. When the data storage device is recovered from a power loss, the control unit reads the logical address information based on the map scan information. The control unit rebuild an address map based on the read logic address information.

According to example embodiments, the data storage device may validly rebuild when the data storage device may be recovered from the power loss.

These and other features and advantages of the present invention will become apparent to those skilled in the art of the present invention from the following detailed description in conjunction with the following drawings.

DETAILED DESCRIPTION

Hereinafter, the present invention will be described through various exemplary embodiments with reference to the accompanying drawings.

Figure 1:
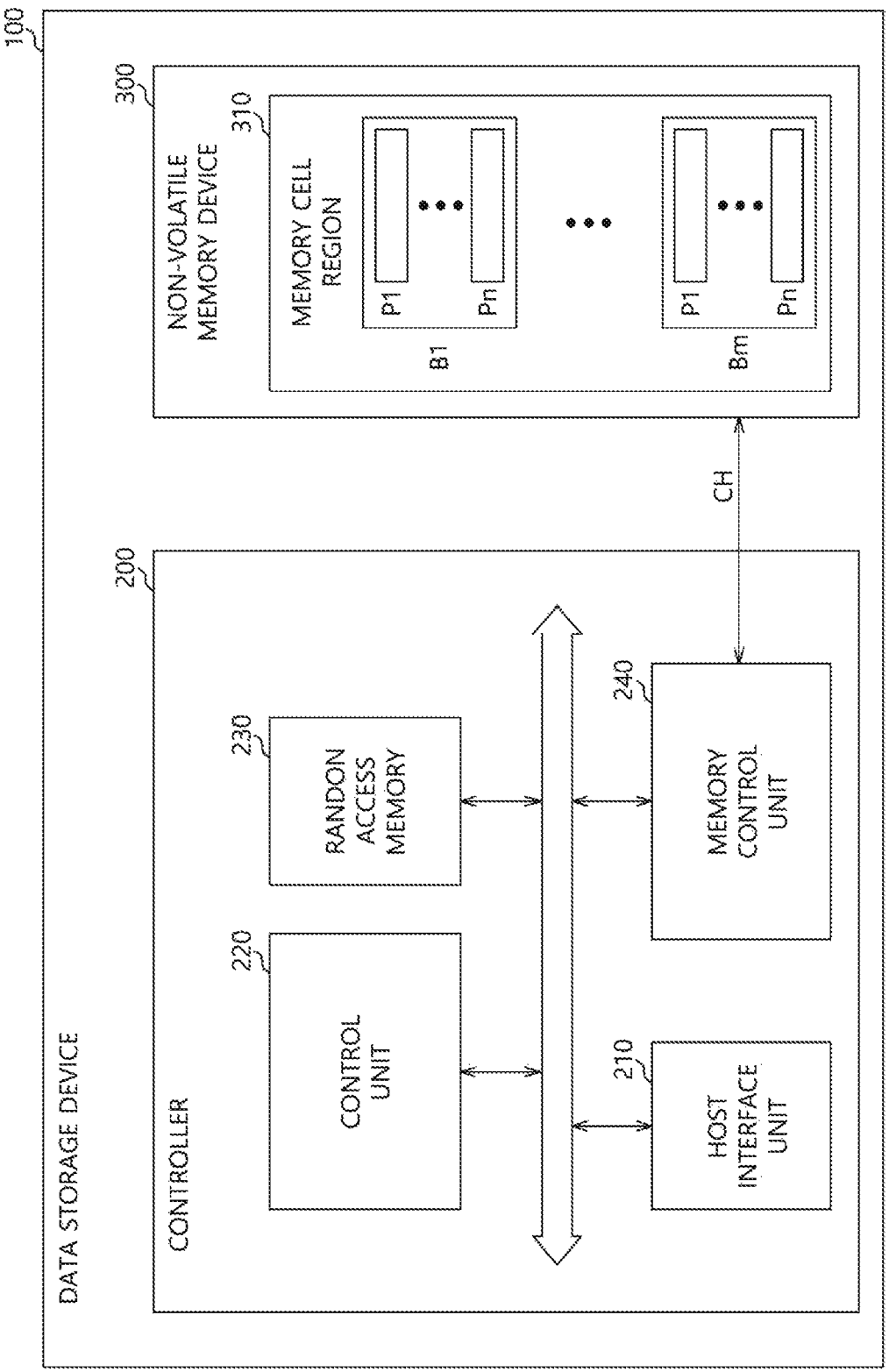
FIG. 1 is a block diagram illustrating a data storage device in accordance with example embodiments.

FIG. 1 is a block diagram illustrating a data storage device 100 in accordance with example embodiments.

Referring to FIG. 1, the data storage device 100 may be configured to store data accessed by a host device (not shown) such as a cellular phone, an MP3 player, a laptop computer, a desktop computer, a game machine, a television (TV), an in-vehicle infotainment system, etc. In some embodiments, the data storage device 100 may be referred to as a memory system.

The data storage device 100 may have various configurations in accordance with a host interface protocol of the host device. For example, the data storage device 100 may include a solid state drive (SSD), a multimedia card such as an MMC, an eMMC or a micro-MMC, a secure digital card such as an SD, a mini-SD or a micro-SD, a universal storage bus (USB), a universal flash storage (UFS), a personal computer memory card international association (PCMCIA) card, a peripheral component interconnection (PCI) card, a PCI-e (PCI express) card, a compact flash (CF) card, a smart media card, a memory stick, and the like.

The data storage device 100 may have various package types. For example, the data storage device 100 may include a package on package (POP), a system in package (SIP), a system on chip (SOC), a multi chip package (MCP), a chip on board (COB), a wafer-level fabricated package (WFP), a wafer-level stack package (WSP), etc.

The data storage device 100 may include a controller 200 and a non-volatile memory device 300.

The controller 200 may include a host interface unit 210, a control unit 220, a random access memory 230 and a memory control unit 240.

The host interface unit 210 may be configured to interface between the host device and the data storage device 100. For example, the host interface unit 210 may be communicated with the host device using a host interface such as any one of standard transmission protocols including a universal serial bus (USB), a universal flash storage (UFS), a multi media card (MMC), a parallel advanced technology attachment (PATA), a serial advanced technology attachment (SATA), a small computer system interface (SCSI), a serial attached SCSI (SAS), a peripheral component interconnection (PCI) and a PCI-e (PCI express).

The control unit 220 may include a micro control unit (MCU) and/or a central processing unit (CPU). The control unit 220 may be configured to process requests received from the host device. In order to process the request, the control unit 220 may be configured to drive a firmware such as a code type instruction and/or an algorithm loaded into the random access memory 230 and to control the functional blocks 210, 230, 240 and 250 and the non-volatile memory device 300.

The random access memory 230 may include a memory such as a dynamic random access memory (DRAM) or a static random access memory (SRAM). The random access memory 230 may be configured to store the firmware driven by the control unit 220. The random access memory 230 may be configured to store data for driving the firmware such as Meta data. That is, the random access memory 230 may be operated as a working memory of the control unit 220.

The memory control unit 240 may be configured to the non-volatile memory device 300 under the control of the control unit 220. In some embodiments, the memory control unit 240 may be referred to as a memory interface unit. The memory control unit 240 may transmit control signals to the non-volatile memory device 300. The control signals may include commands, addresses, etc., for controlling the non-volatile memory device 300. The memory control unit 240 may transmit and receive the data to and from the non-volatile memory device 300.

The non-volatile memory device 300 may be connected with the controller 200 through a channel CH including at least one signal line through which the commands, the addresses and the control signals may be transmitted and/or received. The non-volatile memory device 300 may be used as a storage medium of the data storage device 100.

The non-volatile memory device 300 may include at least one of a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, a resistive random access memory (RERAM) using transition metal oxide, etc.

The non-volatile memory device 300 may include a memory cell region 310. The memory cell region 310 may include a plurality of memory block B1 to Bm. Each of the memory blocks B1 to Bm may include a plurality of pages P1 to Pn. Memory cells in the memory cell region 310 may form a hierarchical memory cell unit or memory cell set such as a block and a page in accordance with an operational view or a physical or structural view. For example, simultaneously read and written memory cells connected with a same word line may form a page. Simultaneously erased memory cells may form a memory block.

Figure 2:
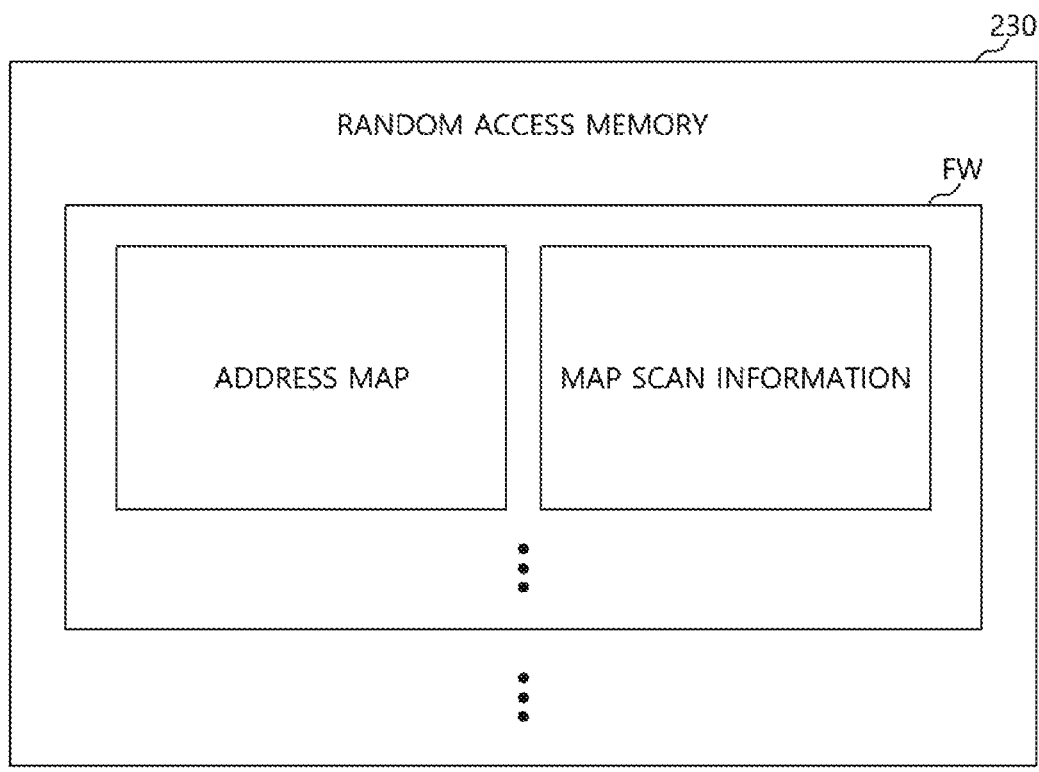
FIG. 2 is a block diagram illustrating a firmware driven by a control unit in accordance with example embodiments.

FIG. 2 is a block diagram illustrating a firmware driven by a control unit 220 of FIG. 1 in accordance with example embodiments.

Referring to FIG. 2, the firmware FW loaded into the random access memory 230 may include an address map MAP and a map scan information MSI. Although not depicted in drawings, the firmware FW loaded into the random access memory 230 may include modules configured to control the non-volatile memory device 300 such as a wear-leveling module, a bad block management module, a garbage collection module, an interleaving module, and/or a power loss management module configured to prepare an abnormal power loss, etc.

The host device may provide a request for accessing the data storage device 100. The host device may provide the data storage device 100 with a logical address. The control unit 220 may translate the logical address into a physical address of the non-volatile memory device 300. The control unit 220 may process the request of the host device based on the physical address. In order to perform the address translation, an address translation information, i.e., the address map MAP may be generated and managed. The address map MAP may include a physical-to-logical (P2L) map in FIG. 3 and a logical-to-physical (L2P) map in FIG. 4.

The map scan information MSI may include information for rebuilding the address map MAP. When a power may be cut off, the map scan information loaded into the random access memory 230 having a volatile characteristic may be lost. Thus, for supporting a backup operation, the map scan information MSI may be stored in a memory block of the non-volatile memory device 300, for example, a meta block MB in FIG. 5. When the data storage device 100 is recovered from a power loss, the control unit 220 can refer to the map scan information MSI which is stored in the non-volatile memory device.

Figure 3:
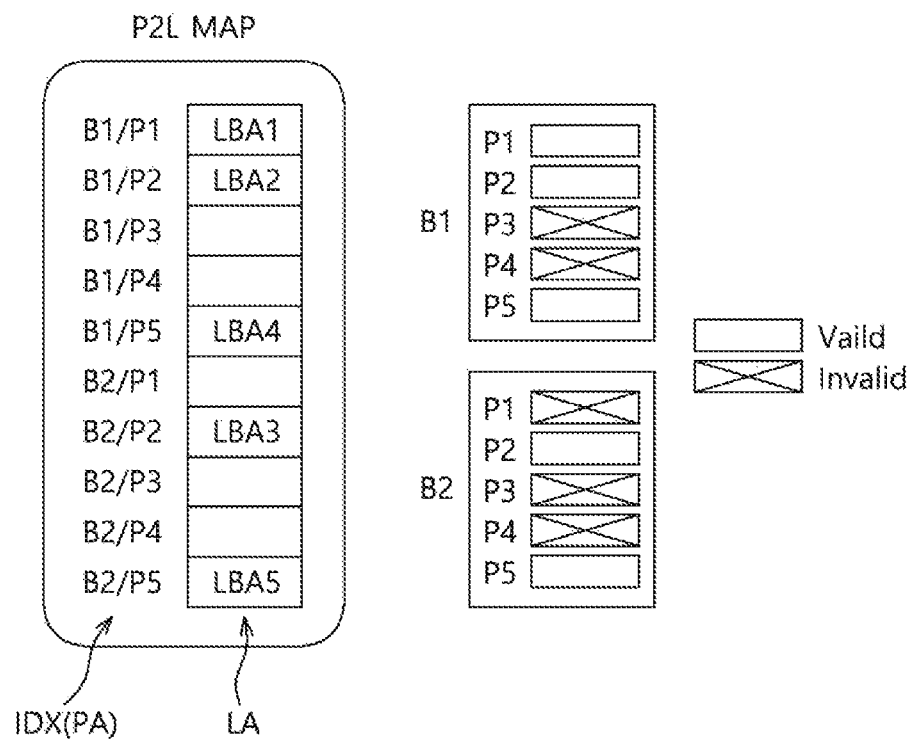
FIG. 3 is a block diagram illustrating a P2L map in accordance with example embodiments.
Figure 4:
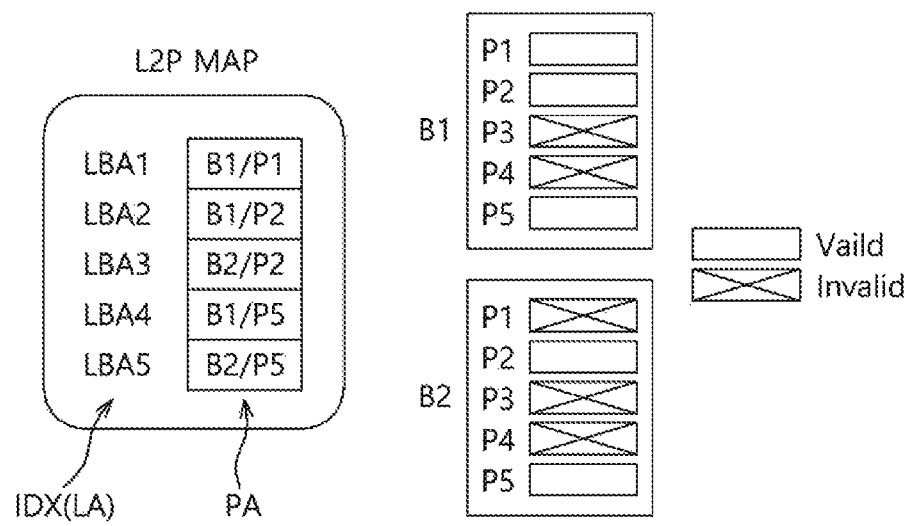
FIG. 4 is a block diagram illustrating an L2P map in accordance with example embodiments.

FIG. 3 is a block diagram illustrating a physical-to-logical (P2L) map in accordance with example embodiments, and FIG. 4 is a block diagram illustrating a logical-to-physical (L2P) map in accordance with example embodiments.

Referring to FIGS. 3 and 4, the P2L map and the L2P map may have substantially the same address translation information. That is, the address translation information obtained from the P2L map may be substantially the same as the address translation information obtained from the L2P map. In order to equalize the P2L map with the L2P map, the L2P map may be generated based on the P2L map. For example, the P2L map may be stored in the memory cell region 310 of the non-volatile memory device 300. The L2P map may be generated based on the P2L map during driving the data storage device 100. The L2P map may be loaded into the random access memory 230.

Referring to FIG. 3, the P2L map may be prepared based on a physical address PA. That is, the P2L map may use the physical address PA as an index IDX. The P2L map may include a logical address LA corresponding to the index IDX.

Referring to FIG. 4, the L2P map may be prepared based on the logical address LA. That is, the L2P map may use the logical address LA as the index IDX. The L2P map may include the physical address PA corresponding to the index IDX.

Figure 5:
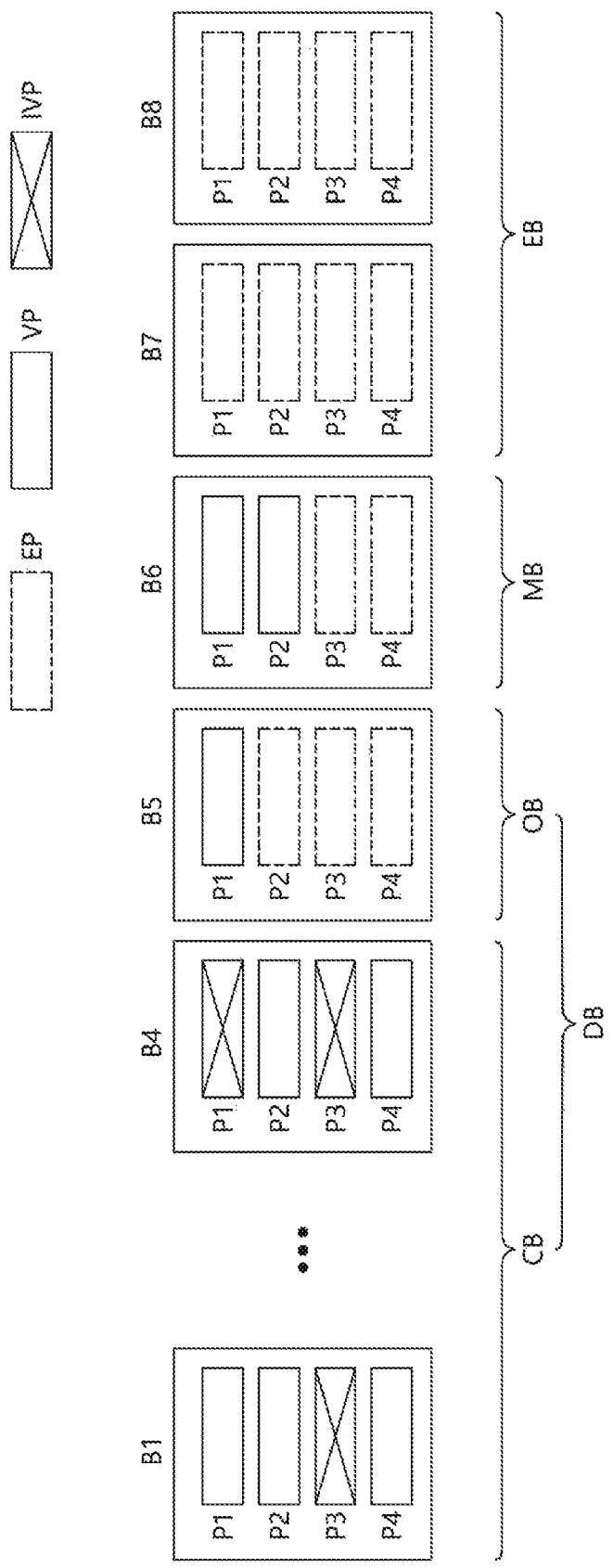
FIG. 5 is a block diagram illustrating a memory block in accordance with example embodiments.

FIG. 5 is a block diagram illustrating a memory block in accordance with example embodiments. In FIG. 5, each of the memory blocks B1 to B8 may include, as an example, four pages P1 to P4. The numbers of the memory blocks and the pages in the memory cell region 310 may be changed by design The memory blocks B1 to B8 may be classified into empty memory blocks EB, meta memory blocks MB and data memory blocks DB. The memory blocks B1 to B8 may be classified into uses and applications of the control unit 220.

The data memory block DB may be defined as a memory block configured to store user data. The user data may include data generated and used by a software of the host device controlled by a user such as application program codes, files, etc. The data memory block DB may be classified into a closed memory block CB and an open memory block OB.

The closed memory block CB may be defined as a memory block for which a write operation has been completed. That is, a closed memory block CB has all of its pages in which the data may be stored written with data. A closed memory block CB may include one or more valid pages VP in which valid data are stored, and one or more invalid pages IVP in which invalid data are stored.

The open memory block OB may be defined as a memory block for which a write operation may be processed. That is, an open memory block OB may include one or more pages in which data may be stored. The open memory block OB may include one or more valid pages VP and one or more empty pages EP. The data stored in the open memory block OB may be transmitted to the closed memory block CB. Alternatively, an open memory block OB may be converted into a closed memory block CB. Therefore, an open memory block OB may be referred to as a log block or a buffer block.

A meta memory block MB may be defined as a memory block configured to store meta data. The meta data for driving the firmware may include data generated and used by the controller 200 such as the address map MAP and the map scan information MSI.

An empty memory block EB may be defined as a memory block in which there are no stored data. When the data in the meta memory block MB and the data memory block DB are erased, the meta memory block MB and the data memory block DB are converted into empty memory blocks EB.

Figure 6:
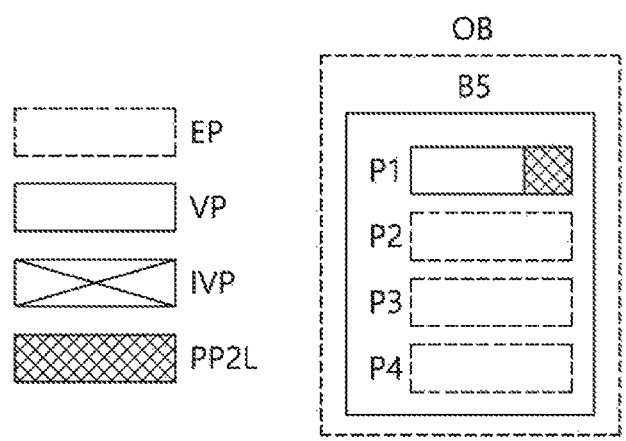
FIG. 6 is a block diagram illustrating a page P2L information in accordance with example embodiments.

FIG. 6 is a block diagram illustrating a page P2L information PP2L in accordance with example embodiments. In order to explain the page P2L information PP2L, the open memory block OB to which the write operation may be processed is shown in FIG. 6.

The logical address information mapped in the physical address, for example, a page address may be stored in a page in which the data may be stored together with the data. The logical address information stored together with the data may be defined as the page P2L information PP2L. Referring to FIG. 6, for example, the page P2L information PP2L mapped in a first page P1 of a fifth block B5 may be stored in the first page P1 of the fifth block B5 together with the valid data.

Figure 7:
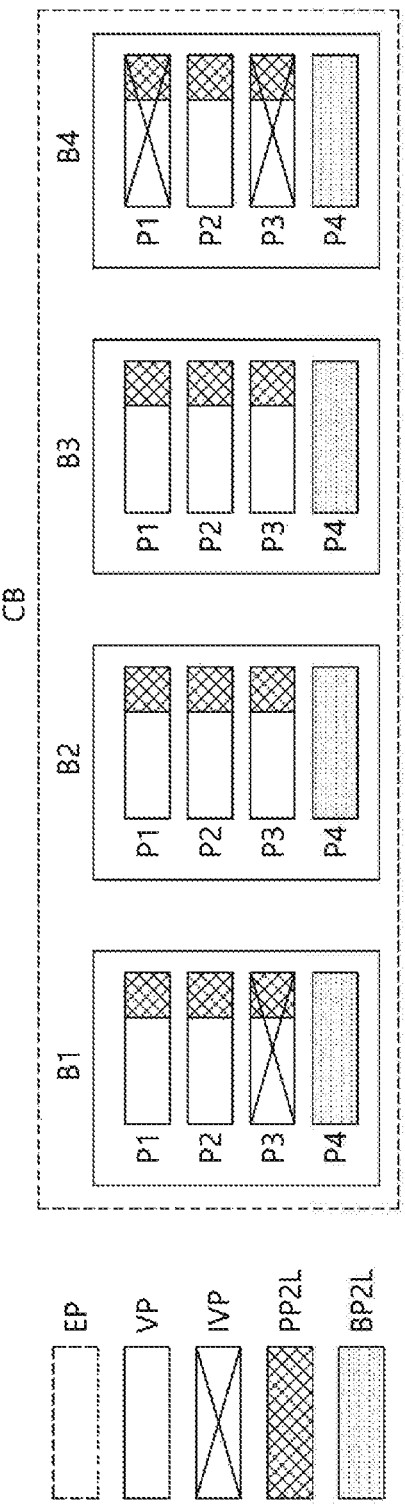
FIG. 7 is a block diagram illustrating a block P2L information in accordance with example embodiments.

FIG. 7 is a block diagram illustrating a block P2L information BP2L in accordance with example embodiments. In order to explain the block P2L information BP2L, the closed block CB of all of the pages in which the data may be stored may be shown in FIG. 7.

The page P2L information PP2L of each of the valid pages VP in the memory block may be stored in any one of the pages in the memory block. The page P2L information PP2L of each of the valid pages VP of the memory block, which may be stored in any one of the pages of the memory block, may be defined as the block P2L information BP2L. In other words, the block P2L information BP2L may include the page P2L information for all valid pages included in the memory block and may be stored in one page in the memory block. For example, the block P2L information BP2L may be stored in a last page in the memory block, but the present invention is not limited in this way. Referring to FIG. 7, for example, the page P2L information PP2L stored in a first page P1 and a second page P2 of a first memory block B1 may be again stored in a fourth page P4 of the first memory block B1. The page P2L information PP2L stored in first to third pages P1, P2 and P3 of a second memory block B2 may be again stored in a fourth page P4 of the second memory block B2. The page P2L information PP2L stored in the first to third pages P1, P2 and P3 of a third memory block B3 may be again stored in a fourth page P4 of the third memory block B3. The page P2L information PP2L stored in a second page P2 of a fourth memory block B4 may be again stored in a fourth page P4 of the fourth memory block B4.

The control unit 220 of FIG. 1 may be configured to generate or update the L2P map based on the block P2L information BP2L.

Figure 8:
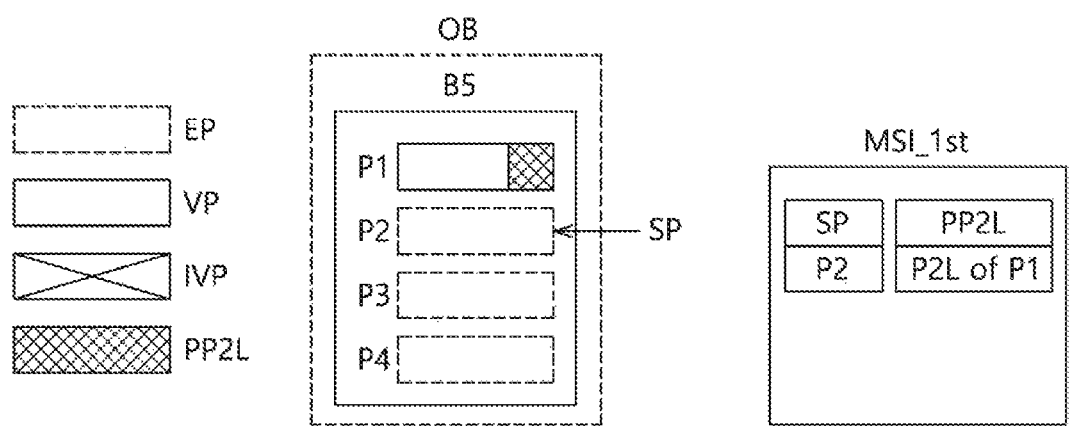
FIG. 8 is a block diagram illustrating an initially generated map scan information in accordance with example embodiments.

FIG. 8 is a block diagram illustrating an initially generated map scan information in accordance with example embodiments.

Referring to FIG. 8, in order to rebuild the address map MAP when the data storage device 100 is recovered from a power loss, the control unit 220 may refer to the map scan information MSI stored in the meta memory block MB of the memory cell region 310. The control unit 220 may scan the page P2L information PP2L of a fifth memory block B5 as the open memory block OB based on the map scan information MSI. The control unit 220 may reflect the scanned information on the P2L map.

The map scan information MSI may include a scan pointer SP. The scan pointer SP may be used as position information for scanning the page P2L information PP2L of the open memory block OB. For example, the scan pointer SP may indicate a page P2 next to a page P1 to which the write operation may be lastly performed. When the write operation may be sequentially performed from the first page P1 to the fourth page P4, the scan pointer SP may indicate the second page P2 next to the first page P1 to which the write operation may be lastly performed. Alternatively, the scan pointer SP may indicate the second page P2 to which the write operation may be performed first among the empty pages P2, P3 and P4.

The map scan information MSI may include the page P2L information PP2L of the page in which the data of the open memory block OB may be stored. The page P2L information PP2L of the page in which the data of the open memory block OB may be stored may be scanned based on the scan pointer SP. For example, the page P2L information PP2L in the map scan information MSI may include the page P2L information PP2L of the pages scanned from the present scan pointer SP to the previous scan pointer SP.

As shown in FIG. 8, an initially generated map scan information MSI_1st may include one scan pointer SP. In this case, the page P2L information PP2L of the memory block B5 as the open memory block OB may include the page P2L information PP2L of the scanned pages from the present scan pointer SP=P2 to the first page P1.

Figure 9:
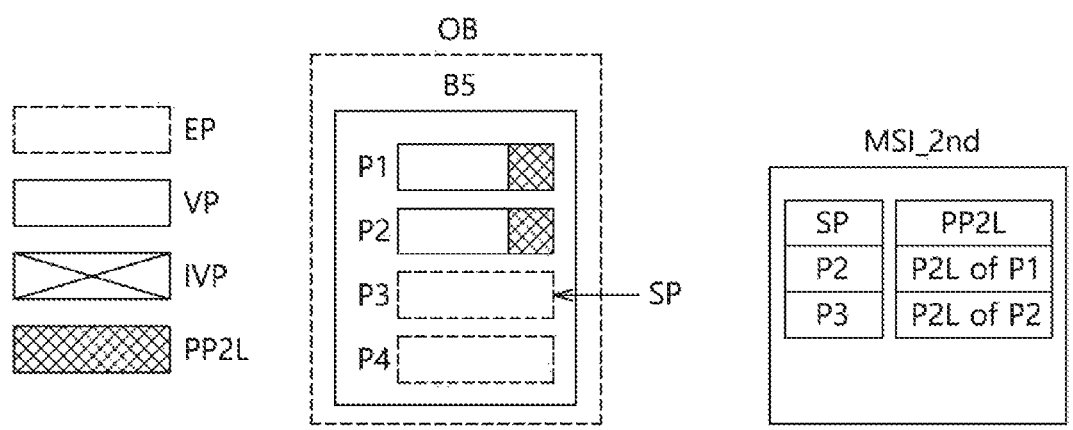
FIG. 9 is a block diagram illustrating an updated map scan information in accordance with example embodiments.

FIG. 9 is a block diagram illustrating an updated map scan information in accordance with example embodiments.

Referring to FIG. 9, the map scan information MSI stored in the meta memory block MB of FIG. 5 may be generated or updated when the backup event may be generated or the data storage device 100 may be recovered from the power loss. A map scan information MSI_2nd may be obtained by updating the initial map scan information MSI_1st of FIG. 8.

When a lastly written page may be changed until the map scan information MSI_2nd was updated, the scan pointer SP may be updated. That is, the previous scan pointer may be changed into the present scan pointer. For example, when the lastly written page may be changed from the first page P1 into the second page P2, the previous scan pointer SP=P2 may be changed into the present scan pointer SP=P3.

The page P2L information PP2L of the open memory block OB may be updated in accordance with the updating of the scan pointer SP. That is, the pages may be scanned from the present scan pointer to the previous scan pointer so that the page P2L information PP2L of the open memory block OB may be updated. For example, the page P2L information PP2L of the open memory block OB may include the page P2L information PP2L of the scanned pages P2 and P3 from the present scan pointer SP=P3 to the previous scan pointer SP=P2. Because the present scan pointer SP=P3 may correspond to the empty page EP, the page P2L information PP2L of the third page P3 may not be reflected to the map scan information MSI_2nd although the page of the present scan pointer SP=P3 may be scanned.

Figure 10:
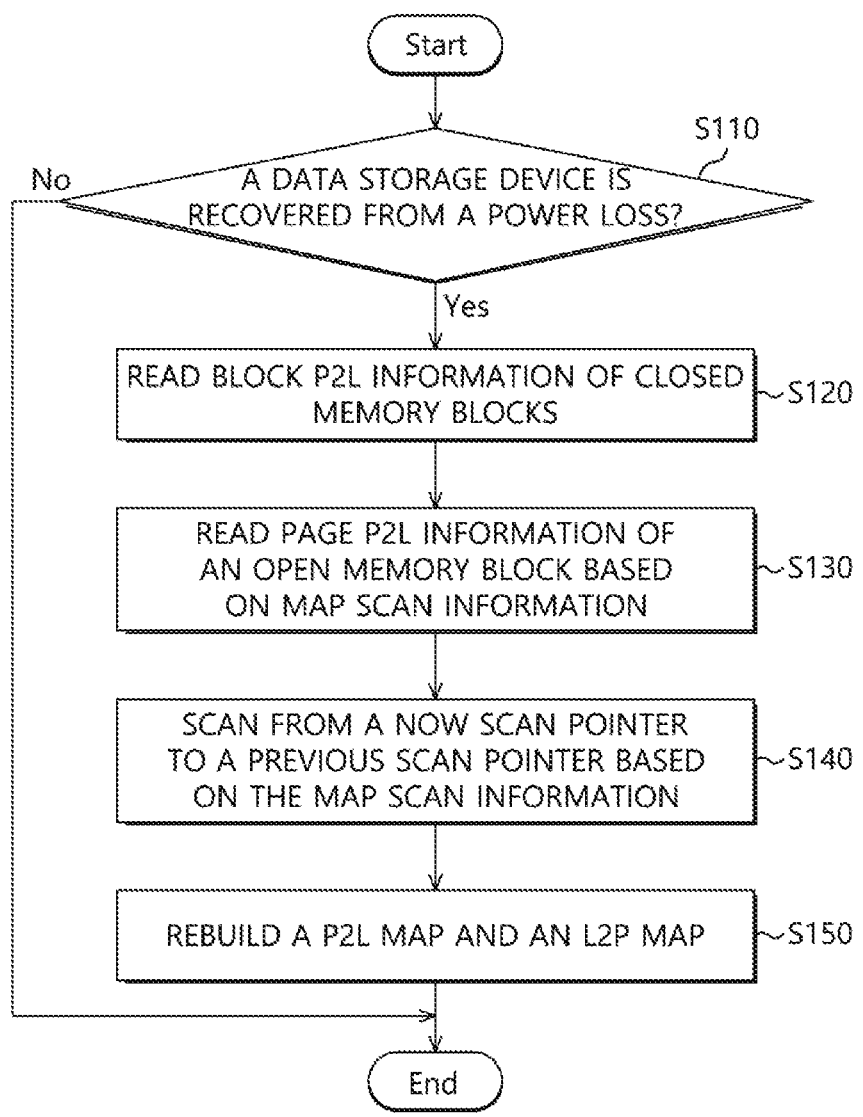
FIG. 10 is a flow chart illustrating a method of operating a data storage device in accordance with example embodiments.

FIG. 10 is a flow chart illustrating a method of operating a data storage device in accordance with example embodiments. In FIG. 10, operations for rebuilding the address map MAP performed by the control unit 220 of FIG. 1 may be illustrated when the data storage device 100 may be recovered from the power loss.

Referring to FIG. 10, in step S110, the control unit 220 may determine whether or not the data storage device 100 is being recovered from a power loss. When the data storage device 100 is not recovered from a power loss, processes performed by the method may be ended.

In step S120, when the data storage device 100 is being recovered from the power loss, the control unit 220 may read the block P2L information of the closed memory blocks.

In step S130, the control unit 220 may read the page P2L information of the open memory block OB based on the map scan information MSI in the meta memory block MB.

In step S140, the control unit 220 may scan at least one page from the present scan pointer to the previous scan pointer based on the map scan information MSI in the meta memory block MB. When the at least one page may be scanned from the present scan pointer to the previous scan pointer, the page P2L information of the scanned page may be read.

In step S150, the control unit 220 may rebuild the P2L map based on the block P2L information BP2L and the page P2L information PP2L read in steps S120 to S140. The control unit 220 may rebuild the L2P map based on the P2L map. For example, the control unit 220 may merge the block P2L information read BP2L in step S120, the page P2L information PP2L read in step S130 and the P2L information read in step S140 with each other to rebuild the P2L map.

Figure 11:
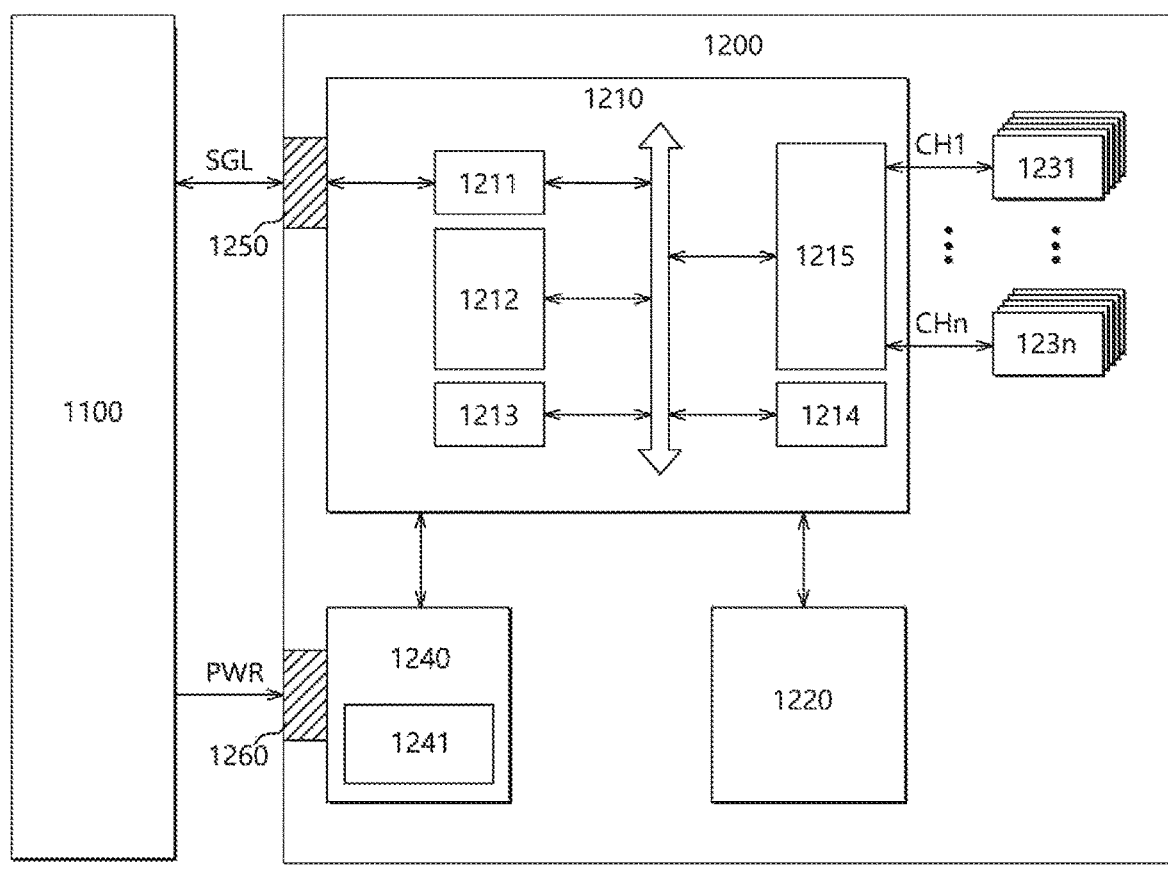
FIG. 11 is a diagram illustrating an example of a data processing system including a solid state drive in accordance with an embodiment.

FIG. 11 is a diagram illustrating an example of a data processing system 1000 including a solid state drive (SSD) 1200 in accordance with an embodiment. Referring to FIG. 11, the data processing system 1000 may include a host device 1100 and the SSD 1200.

The SSD 1200 may include a controller 1210, a buffer memory device 1220, nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface between the host device 1100 and the SSD 1200 according to the protocol of the host device 1100. For example, the host interface unit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e) and universal flash storage (UFS).

The control unit 1212 may analyze and process the signal SGL inputted from the host device 1100. The control unit 1212 may control operations of internal function blocks according to a firmware or a software for driving the SSD 1200. The random access memory 1213 may be used as a working memory for driving such a firmware or software.

The ECC unit 1214 may generate the parity data for data to be transmitted to the nonvolatile memory devices 1231 to 123n. The generated parity data may be stored together with the data in the nonvolatile memory devices 1231 to 123n. The ECC unit 1214 may detect an error of the data read out from the nonvolatile memory devices 1231 to 123n, based on the parity data. If a detected error is within a correctable range, the ECC unit 1214 may correct the detected error.

The memory interface unit 1215 may provide control signals such as commands and addresses to the nonvolatile memory devices 1231 to 123n, according to control of the control unit 1212. Moreover, the memory interface unit 1215 may exchange data with the nonvolatile memory devices 1231 to 123n, according to control of the control unit 1212. For example, the memory interface unit 1215 may provide the data stored in the buffer memory device 1220, to the nonvolatile memory devices 1231 to 123n, or provide the data read out from the nonvolatile memory devices 1231 to 123n, to the buffer memory device 1220.

The buffer memory device 1220 may temporarily store data to be stored in the nonvolatile memory devices 1231 to 123n. Further, the buffer memory device 1220 may temporarily store the data read out from the nonvolatile memory devices 1231 to 123n. The data temporarily stored in the buffer memory device 1220 may be transmitted to the host device 1100 or the nonvolatile memory devices 1231 to 123n according to control of the controller 1210.

The nonvolatile memory devices 1231 to 123n may be used as storage medium of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include at least one capacitor with large capacity.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 12:
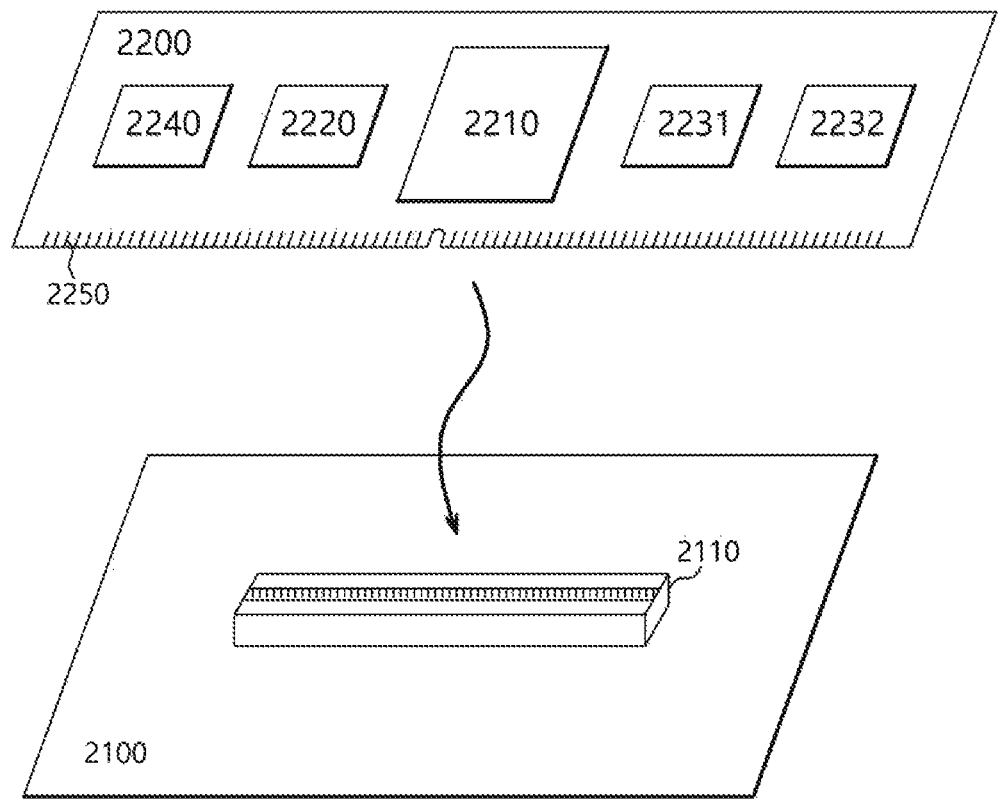
FIG. 12 is a diagram illustrating an example of a data processing system including a data storage device in accordance with an embodiment.

FIG. 12 is a diagram illustrating an example of a data processing system 2000 including a data storage device 2200 in accordance with an embodiment. Referring to FIG. 12, the data processing system 2000 may include a host device 2100 and the data storage device 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The data storage device 2200 may be mounted to the connection terminal 2110.

The data storage device 2200 may be configured in the form of a board such as a printed circuit board. The data storage device 2200 may be referred to as a memory module or a memory card. The data storage device 2200 may include a controller 2210, a buffer memory device 2220, nonvolatile memory devices 2231 and 2232, a power management integrated circuit (PMIC) 2240, and a connection terminal 2250.

The controller 2210 may control general operations of the data storage device 2200. The controller 2210 may be configured in the same manner as the controller 1210 shown in FIG. 11.

The buffer memory device 2220 may temporarily store data to be stored in the nonvolatile memory devices 2231 and 2232. Further, the buffer memory device 2220 may temporarily store the data read out from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage medium of the data storage device 2200.

The PMIC 2240 may provide the power inputted through the connection terminal 2250, to the inside of the data storage device 2200. The PMIC 2240 may manage the power of the data storage device 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the data storage device 2200. The connection terminal 2250 may be configured into various types depending on an interface scheme between the host device 2100 and the data storage device 2200. The connection terminal 2250 may be disposed on any one side of the data storage device 2200.

Figure 13:
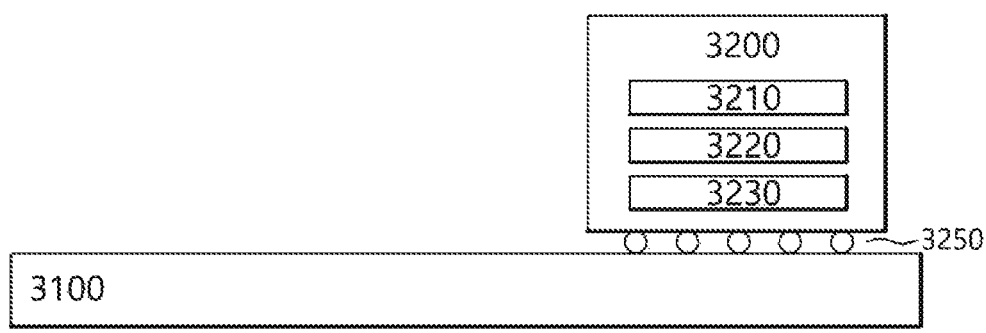
FIG. 13 is a diagram illustrating an example of a data processing system including a data storage device in accordance with an embodiment.

FIG. 13 is a diagram illustrating an example of a data processing system 3000 including a data storage device 3200 in accordance with an embodiment. Referring to FIG. 13, the data processing system 3000 may include a host device 3100 and the data storage device 3200.

The host device 3100 may be configured in the form of a board such as a printed circuit board. Although not shown, the host device 3100 may include internal function blocks for performing the function of a host device.

The data storage device 3200 may be configured in the form of a surface-mounting type package. The data storage device 3200 may be mounted to the host device 3100 through solder balls 3250. The data storage device 3200 may include a controller 3210, a buffer memory device 3220, and a nonvolatile memory device 3230.

The controller 3210 may control general operations of the data storage device 3200. The controller 3210 may be configured in the same manner as the controller 1210 shown in FIG. 11.

The buffer memory device 3220 may temporarily store data to be stored in the nonvolatile memory device 3230. Further, the buffer memory device 3220 may temporarily store the data read out from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the data storage device 3200.

Figure 14:
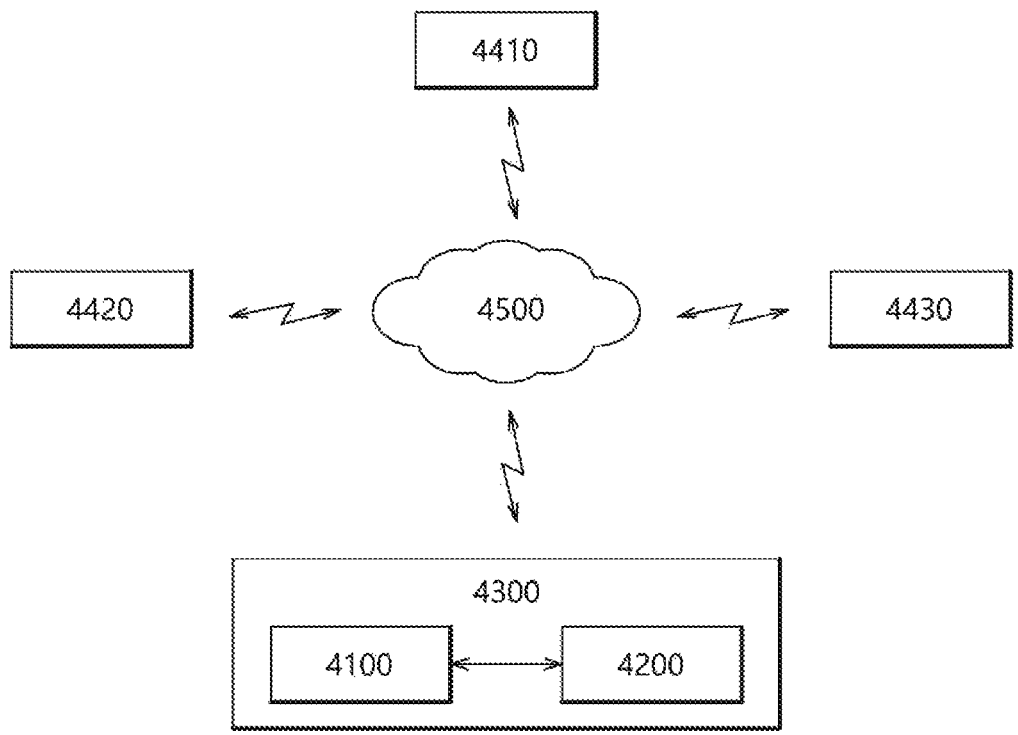
FIG. 14 is a diagram illustrating an example of a network system including a data storage device in accordance with an embodiment.

FIG. 14 is a diagram illustrating an example of a network system 4000 including a data storage device 4200 in accordance with an embodiment. Referring to FIG. 14, the network system 4000 may include a server system 4300 and a plurality of client systems 4410 to 4430 which are coupled through a network 4500.

The server system 4300 may serve data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the data storage device 4200. The data storage device 4200 may be configured by the data storage device 100 shown in FIG. the data storage device 1200 shown in FIG. 11, the data storage device 2200 shown in FIG. 12 or the data storage device 3200 shown in FIG. 13.

Figure 15:
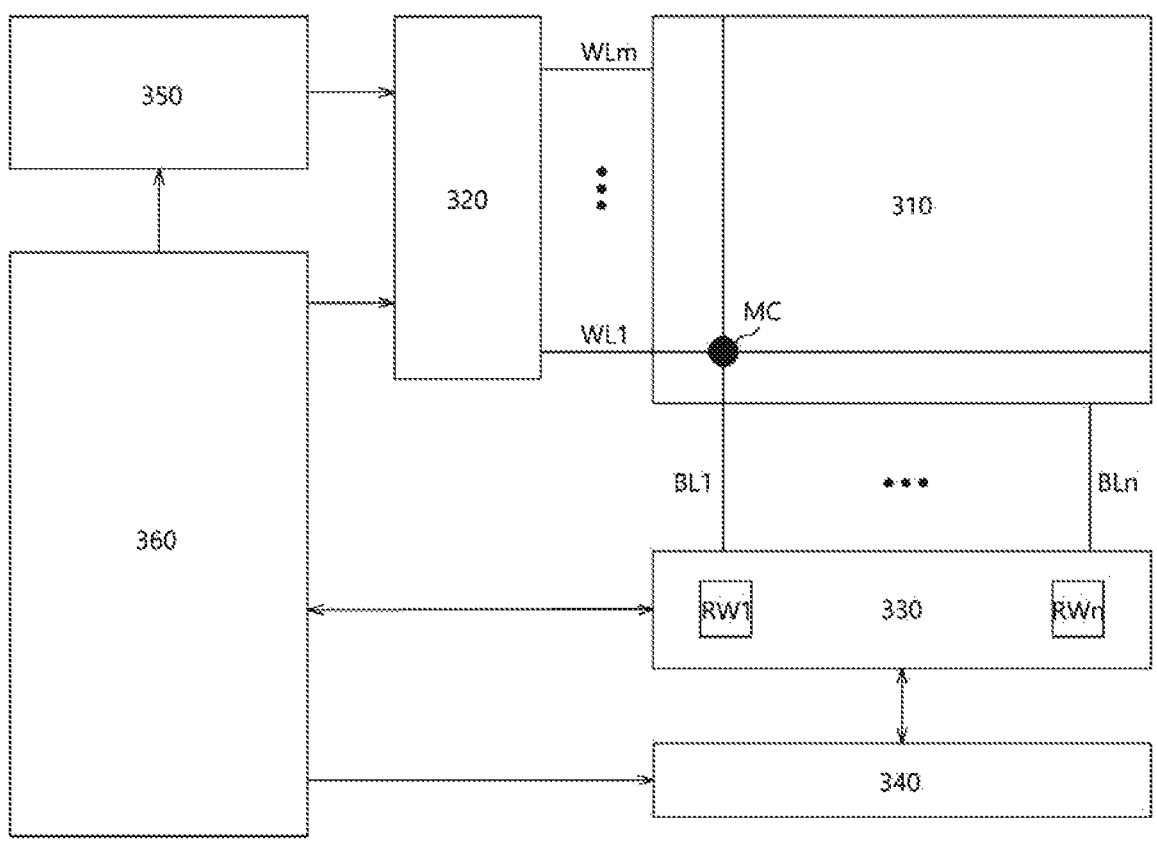
FIG. 15 is a block diagram illustrating an example of a nonvolatile memory device included in a data storage device according to an embodiment of the present disclosure.

FIG. 15 is a block diagram illustrating a nonvolatile memory device 300 included in a data storage device according to an embodiment. Referring to FIG. 15, the nonvolatile memory device 300 may include a memory cell array 310, a row decoder 320, a column decoder 340, a data read/write block 330, a voltage generator 350, and a control logic 360.

The memory cell array 310 may include memory cells MC arranged in regions in which word lines WL1 to WLm and bit lines BL1 to BLn cross to each other.

The row decoder 320 may be coupled to the memory cell array 310 through the word lines WL1 to WLm. The row decoder 320 may operate through control of the control logic 360. The row decoder 320 may decode an address provided from an external apparatus (not shown). The row decoder 320 may select and drive the word lines WL1 to WLm based on a decoding result. For example, the row decoder 320 may provide a word line voltage provided from the voltage generator 350 to the word lines WL1 to WLm.

The data read/write block 330 may be coupled to the memory cell array 310 through the bit lines BL1 to BLn. The data read/write block 330 may include read/write circuits RW1 to RWn corresponding to the respective bit lines BL1 to BLn. The data read/write block 330 may operate according to control of the control logic 360. The data read/write block 330 may operate as a write driver or a sense amplifier according to an operation mode. For example, the data read/write block 330 may operate as the write driver configured to store data provided from an external apparatus in the memory cell array 310 in a write operation. In another example, the data read/write block 330 may operate as the sense amplifier configured to read data from the memory cell array 310 in a read operation.

The column decoder 340 may operate though control of the control logic 360. The column decoder 340 may decode an address provided from an external apparatus (not shown). The column decoder 340 may couple the read/write circuits RW1 to RWn of the data read/write block 330 corresponding to the bit lines BL1 to BLn and data input/output (I/O) lines (or data I/O buffers) based on a decoding result.

The voltage generator 350 may generate voltages used for an internal operation of the nonvolatile memory device 300. The voltages generated through the voltage generator 350 may be applied to the memory cells of the memory cell array 310. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 360 may control an overall operation of the nonvolatile memory device 300 based on a control signal provided from an external apparatus. For example, the control logic 360 may control an operation of the nonvolatile memory device 300 such as a read operation, a write operation, an erase operation of the nonvolatile memory device 300.

The above embodiments of the present disclosure are illustrative and not limitative. Various alternatives and equivalents are possible. The examples of the embodiments are not limited by the embodiments described herein. Nor is the present disclosure limited to any specific type of semiconductor device. Other additions, subtractions, or modifications are obvious in view of the present disclosure and are intended to fall within the scope of the appended claims.

What is claimed is:

1. A method of operating a data storage device, the data storage device including a non-volatile memory device, which includes a closed memory block and an open memory block, the method comprising:

generating a map scan information including a scan pointer indicating a page of the open memory block that is next to a page to which a write operation was last performed and a logical address information consisting of logical addresses mapped in one or more pages of the open memory block up to a previous page of the page to which the scan pointer indicates;

obtaining logical addresses mapped in all of pages of the open memory block in which data is stored based on the map scan information; and rebuilding an address map for the open memory block based on the obtained logical addresses, wherein when the data storage device is recovered from a power loss, the obtaining of the logical addresses comprises: scanning pages of the open memory block beginning from a first page indicated by a most recent scan pointer in the map scan information to a second page indicated by a scan pointer immediately before the most recent scan pointer.

2. The method of claim 1, wherein the obtaining of the logical addresses further comprises:

reading a logical address stored in the scanned pages; and reading the logical address information included in the map scan information.

3. The method of claim 2, wherein the rebuilding of the address map for the open memory block comprises merging the read logical address with the read logical address information.

4. The method of claim 1, further comprising:

reading logical address information mapped in at least one valid page of the closed memory block when the data storage device is recovered from the power loss; and rebuilding an address map for the closed memory block based on the read logical address information.

5. The method of claim 4, wherein the reading of the logical address information mapped in the at least one valid page of the closed memory block comprises reading the logical address information mapped in all of valid pages of the closed memory block stored in any one of the pages of the closed memory block.

6. The method of claim 4, further comprising:

merging the rebuilt address map for the open memory block with the rebuilt address map for the closed memory block.

7. The method of claim 1, further comprising updating the map scan information when a backup event is generated or the data storage device is recovered from the power loss.

8. The method of claim 7, wherein the updating of the map scan information comprises updating the scan pointer to indicate a page next to a lastly written page until the map scan information is updated.

9. The method of claim 7, wherein the updating of the map scan information comprises:

scanning a page of the open memory block from an updated scan pointer to non-updated scan pointer;

reading a logical address stored in the scanned page; and updating the logical address information for the open memory block to include the read logical address.

10. A data storage device comprising:

a non-volatile memory device including a closed memory block and an open memory block; and a control unit configured to generate and manage an address map for the open memory block, wherein the control unit is configured to:

generate a map scan information including a scan pointer and a logical address information, the scan pointer indicating a page of the open memory block next to a page to which a write operation is lastly performed, and the logical address information consisting of logical addresses mapped in one or more pages of the open memory block up to a previous page of the page to which the scan pointer indicates;

obtain logical addresses mapped in all of pages of the open memory block in which data is stored based on the map scan information; and rebuild an address map for the open memory block based on the obtained logical addresses, wherein, when the data storage device is recovered from a power loss the logical addresses are obtained by the control unit scanning pages of the open memory block beginning from a first page indicated by a most recent scan pointer to a second page indicated by a scan pointer immediately before the most recent scan pointer.

11. The data storage device of claim 10, wherein the control unit, to obtain the logical addresses mapped in all of pages of the open memory block in which data is stored, reads a logical address stored in the scanned pages, and reads the logical address information included in the map scan information.

12. The data storage device of claim 11, wherein the control unit, to rebuild the address map for the open memory block, merges the read logical address with the read logical address information.

13. The data storage device of claim 10, wherein the control unit reads logical address information mapped in at least one valid page of the closed memory block when the data storage device is recovered from the power loss, and rebuilds an address map for the closed memory block based on the read logical address information.

14. The data storage device of claim 13, wherein the control unit reads the logical address information mapped in all of valid pages of the closed memory block stored in any one of the pages of the closed memory block.

15. The data storage device of claim 13, wherein the control unit merges the rebuilt address map for the open memory block with the rebuilt address map for the closed memory block.

16. The data storage device of claim 10, wherein the control unit updates the map scan information when a backup event is generated or the data storage device is recovered from the power loss.

17. The data storage device of claim 16, wherein the control unit updates the scan pointer to indicate a page next to a lastly written page until the map scan information is updated.

18. The data storage device of claim 16, wherein the control unit scans a page of the open memory block from an updated scan pointer to non-updated scan pointer, and updates the logical address information for the open memory block to include the read logical address.

* * * * *